United States Patent
Kondal et al.

(10) Patent No.: US 12,321,321 B1
(45) Date of Patent: *Jun. 3, 2025

(54) ENHANCED USER PROFILE MANAGEMENT ACROSS MULTIPLE DEVICES

(71) Applicant: Amazon Technologies, Inc., Seattle, WA (US)

(72) Inventors: Tegdeep Kondal, Yorba Linda, CA (US); Abhinav Shah, Lake Forest, CA (US); Jayasim Jayakumar, Bangalore (IN); Anmol Dalmia, Sambalpur (IN); Anish Kumar Gupta, Bharatpur (IN); Sarah Christina Shekeran, Bangalore (IN); Sourbh Kamboj, Yamunanagar (IN); Manas Mukunda Karambelkar, Chalisgaon (IN); Vishal Juneja, Sammamish, WA (US); Raymond Michael Amador, Aliso Viejo, CA (US); Lakshmi Prasanna Harika Adiraju, Bothell, WA (US); Mathias Staricka, Bremerton, WA (US); Karthik Balasubramanian, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,323

(22) Filed: Nov. 30, 2023

Related U.S. Application Data

(63) Continuation of application No. 17/356,295, filed on Jun. 23, 2021, now Pat. No. 11,874,808.

(51) Int. Cl.
*G06F 16/21* (2019.01)
*G06F 16/23* (2019.01)
*G06Q 30/01* (2023.01)

(52) U.S. Cl.
CPC .......... *G06F 16/21* (2019.01); *G06F 16/2365* (2019.01); *G06Q 30/01* (2013.01)

(58) Field of Classification Search
CPC ...... G06F 16/21; G06F 16/2365; G06Q 30/01
See application file for complete search history.

(56) References Cited

U.S. PATENT DOCUMENTS

| | | |
|---|---|---|
| 2016/0182658 A1 | 6/2016 | Allinson et al. |
| 2019/0392055 A1 | 12/2019 | Rose et al. |
| 2021/0173897 A1 | 6/2021 | Jakobsson |

*Primary Examiner* — Albert M Phillips, III
(74) *Attorney, Agent, or Firm* — Eversheds Sutherland (US) LLP

(57) ABSTRACT

Devices, systems, and methods are provided for user profile management across multiple devices. A method may include determining, by a first device, that the first device is signed into a customer account; determining that the customer account includes a first user profile and a second user profile, the first user profile having first identity data, and the second user profile having second identity data; determining that third identity data for the first user profile is available for presentation, the third identity data based on a user interaction with a second device; determining that the first user profile is enrolled on the first device; presenting the first identity data using the first device; receiving a second user request to access the first user profile; and presenting, using the first device, content based on the second user request and a user preference associated with the first user profile.

20 Claims, 8 Drawing Sheets

ENHANCED USER PROFILE MANAGEMENT ACROSS MULTIPLE DEVICES

CROSS-REFERENCE TO RELATED PATENT APPLICATION(S)

This application is a continuation of U.S. Non-Provisional application Ser. No. 17/356,295, filed on Jun. 23, 2021, the disclosure of which is hereby incorporated herein by reference in its entirety.

BACKGROUND

Devices increasingly support multiple users and accounts. However, some devices require different users to have their own user accounts and do not allow sharing of user profiles across different user accounts on different devices.

Figure 1:
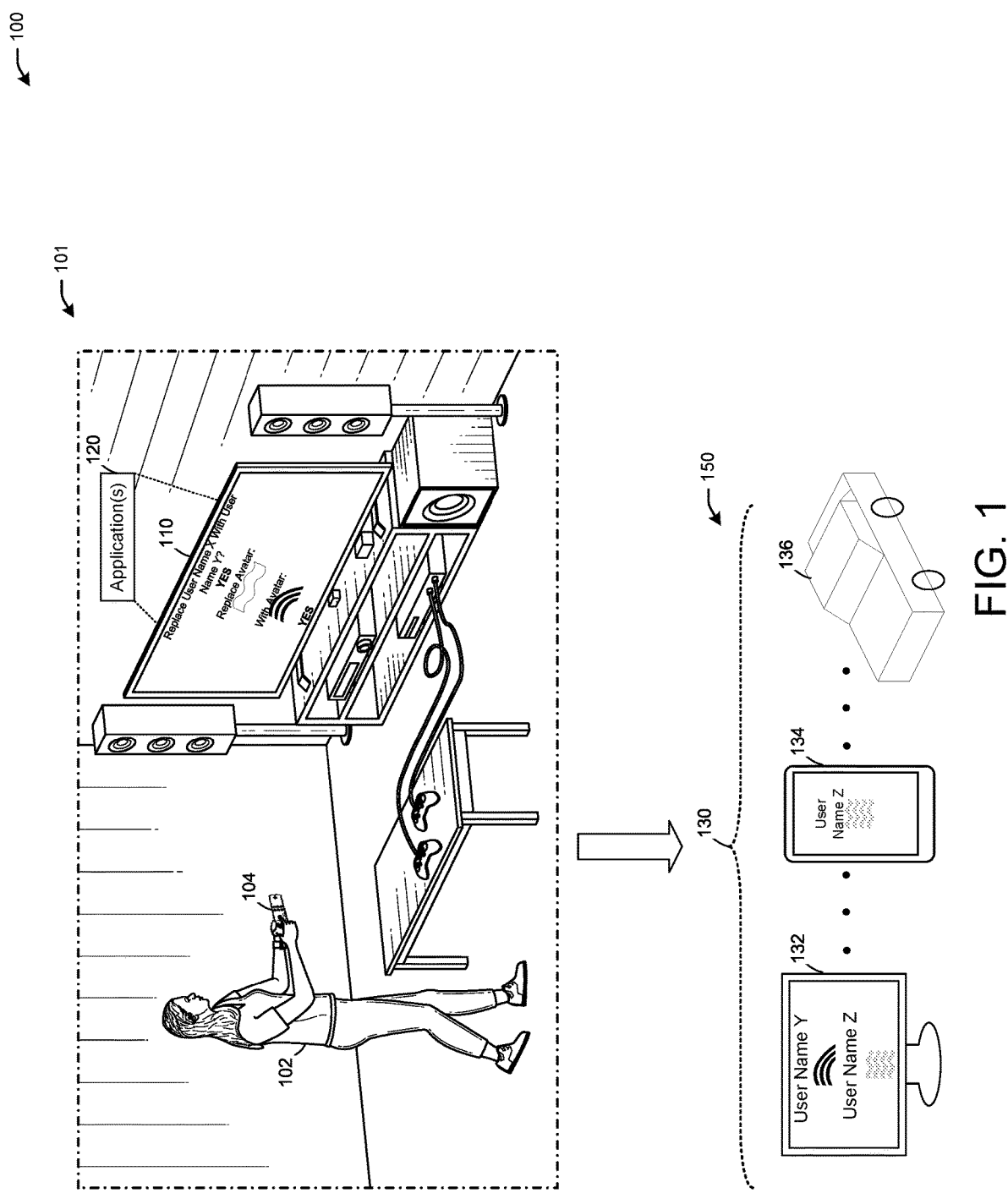
FIG. 1 illustrates an example system for user profile management across devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced user profile management across multiple devices.

Devices may support multiple user accounts for different applications and services, such as shopping services, video streaming services, music streaming services, e-book and audiobook services, interactive activity services, and the like. Some services may require separate user accounts for each user. For example, a user may have an account with a shopping service, another account with a video streaming service, and other accounts for other services. A user may need to sign into each account as the user opens a different application or service on a device. For example, a user may sign into a video streaming service on a device, then may open an application for a different service, and may have to sign into an account for the different service even though the user is the same for both services. In this manner, some devices and services do not allow for managing a user's identity across multiple devices and applications.

Some accounts may allow for multiple profiles. For example, a video streaming service may have a child profile and a parent profile. When the child profile is selected, available and recommended content may differ from the available and recommended content for the parent profile. Some devices may synchronize profile and account information across multiple devices. For example, when user watches a video using an account or profile on one device, the video may be considered as viewing history for the user even when the user accesses the account or profile on another device. However, some devices and services do not allow users to opt into or out of sharing of account or profile data across multiple devices and services. For example, some services may present all available accounts or profiles when the service is accessed, allowing a user to see account or profile data for another user that the other user may not want them to see.

Accordingly, there is a need for enhanced personalization and synchronization of user profiles across multiple devices.

In one or more embodiments, a customer account may allow for multiple users each having one or multiple profiles. For example, a customer account may include user information, such as a name and location, and payment information, such as a billing method and billing address. Multiple user profiles may share a customer account. For example, a person and their spouse each may have separate profiles using the customer account, and children may have a separate profile from their parents under the same customer account.

In one or more embodiments, when signed into a customer account, any user profile under the customer account may be available depending on whether a user has elected to make a user profile available to other users of the customer account (e.g., based on whether a user profile has been enrolled on the device, making the user profile and its data available for presentation on the device). For example, users may opt into or out of sharing of user profiles and profile data (e.g., user preferences, shopping history, viewing history, reading history, etc.) with other users of a customer account. For example, John is a single dad and a customer account holder. He has a profile for him and his son on a device. Jane is a single mom with a daughter and son. She also has her own customer account and a profile for her, her son, and her daughter. John and Jane meet and get married, so John and Jane may enable profile sharing across their accounts such that all family members may see the profiles on their devices. Each family member may have different preferences on the device and a personalized experience based on preferences, user history, and the like, and the preferences may carry over to other devices on which they have a profile when signed into the account having the different user profiles. John and Jane may opt to make their user profiles available on some devices (e.g., may allow their profiles to be eligible for enrollment on some devices, thereby allowing another profile to enroll them on the devices), but not others (e.g., to prevent their children from accessing John's and Jane's user profiles). In this manner, user profile data may be synchronized across some devices, but maybe not all devices. In this manner, when user profile data is updated, the updated user profile data may be pushed to devices on which the user profile is enrolled, and not pushed to devices on which the user profile is not enrolled. Profile enrollment may refer to a user selection of one or more profiles of a customer account to be available on a particular device. Profile enrollment may occur before updated profile data is pushed to a device so that the updated profile data is not pushed to a device on which the profile is not enrolled. Profile enrollment may require an active user step of selecting a profile to enroll on a device, and may be differentiated from a default setting that allows all profiles of a customer account to be accessed on a device when signed into the customer account.

In one or more embodiments, user profiles may have user identity data, such as a user name, address, avatar, and profile type (e.g., adult, child, etc.). User profiles also may have user preferences based on user inputs, user history, and the like. When a user profile is selected, content recommendations and/or other content presented may differ from other user profiles based on the preferences associated with the respective user profile. Users may update their user identity data, such as by changing a user name, avatar, address, or the like. When a user profile is accessible on multiple devices, an update to user profile identity data may be propagated to devices that are allowed to access the user profile and the updated user identity data (e.g., based on a user preference, such as profile enrollment). In this manner, when a device is signed into a customer account and a user profile of the customer account is enrolled on the device, the device may receive an indication that updated user identity data for a user profile is available (e.g., based on a user interaction with another device in which the user updated the user identity data). Based on profile enrollment, the device may present the updated user identity data and any other user identity data for one or more additional user profiles accessible to the device (e.g., user profiles of the customer account). Similarly, an added or deleted user profile may be presented or removed from a customer account.

In one or more embodiments, devices may have a service that may be used by multiple applications on the device. When a user profile is updated, added, or deleted using an application, the service may access an application programming interface (API) and may call the API with a user request to update, add, or delete a user profile for a customer account. In response to an API call, the remote component may return the updated profile data to the device that made the call. APIs may be used for other events as well, such as profile enrollment and un-enrollment. For example, a user may enroll a profile on a device so that the profile is available for use on the device, and so that any updates to the profile (e.g., including updates made on a different device) may be presented using the device on which the profile is enrolled. In this manner, enrolling or un-enrolling a profile on a device may represent a user preference to receive and present data for the profile (or to not receive and present profile data when un-enrolled). A remote component (e.g., a cloud-based component) may listen for events including user requests to update, add, or delete a user profile for a customer account. For example, events may include creation events (e.g., profile creation), update events (e.g., profile updates), enroll events, unenroll events, and delete events (e.g., profile deletion). When a remote component identifies a user profile event, a workflow may be triggered. In particular, the remote component may use a computing instance to publish the event. Another remote component may identify published events and obtain a list of devices that have signed into a customer account with which an event is associated, and on which a user profile for which the event is associated is enrolled. For example, when a published event is identified, the remote component may identify a profile identifier identifying the user profile, and may map the user profile to the corresponding customer account. The remote component may obtain the list of devices which have signed into the customer account and on which the user profile is enrolled, which may include the device used to generate the event, and other devices. A remote messaging service may send messages to the devices to provide the event data (e.g., updated profile identity data, deleted profiles, profile enrollments) and profile metadata, such as profile preferences and/or settings, etc., In this manner, profile events may be propagated to multiple devices to allow for synchronization of profile data across multiple devices. For example, a user may have two devices, and may have settings defined for a user profile on one device. The user may want to have the same settings synchronized to the other device. Because the settings may be associated with user profiles, the devices on which a user profile is enrolled may receive the settings to apply when the user profile is active.

In one or more embodiments, a device may be offline (e.g., a connection between the device and the remote messaging service may be offline), so the device may be unable to receive event data to synchronize user profile data with other devices that use the same user profile. The device may have a persistent data storage that may cache profile data (e.g., profile identity data). The device may receive a message from the remote messaging service indicating that profile event data is available to add, delete, or modify a user profile. However, when the device is offline and cannot receive the event data, the device may present the profile data stored in the persistent data storage when a user signs into a customer account using the device, even though the user profile data for the customer account may not be up-to-date due to the disconnection preventing the event data from being provided to the device. Once the device is online again and receives the event data, the device may store the updated profile data in the persistent data storage. Whether the device needs to receive updated profile data from the remote component may depend on the type of profile event. For example, when a user profile is created or deleted, then the persistent data storage may be considered "dirty" because the persistent data storage either may have deleted profile data or may not yet have access to a newly created user profile. In this manner, when the remote component indicates to the device that a profile event has occurred, and that the profile event includes a new or deleted profile, the state of the persistent data storage may indicate a need to query the remote component, and in response, the device may query the remote component for the new or deleted user profile data. When the persistent data storage is in a dirty state, its user profile data may not be used, and instead the device may query the remote service for updated profile information. In addition, the device may vend available data from the persistent data storage when an on-device service requests profile data and when the remote component is unavailable (e.g., due to a network connection loss).

Even when the remote component is available, the persistent data storage may vend profile data when the persistent data storage is updated, thereby reducing network calls to the remote component and improving system performance. The persistent data storage may store profile data as provided by the remote component. In this manner, the device may receive updated profile data and may update the persistent data storage with the updated profile data.

In one or more embodiments, devices may determine which user profile from among multiple user profiles accessible to the device is active (e.g., being used on the device). Because different applications and services on the device may access the user profile, it may be beneficial for the device to track which user profile is active on an application or service so that when a user accesses a different application or service, the different application or service may use the active profile without requiring the user to sign into the same user profile again. When a user has enrolled a user profile on a device and the customer account is signed into that device, the device may maintain the active user profile in the persistent data storage of the device so that when the user accesses another application or service of the device, the application or service may identify the active user profile as stored in the persistent data storage. In this manner, the persistent data storage may be empty the first time that a device is started and the first time that a customer account is accessed using the device. In addition, an active user profile may be identified as invalid when the active user profile has been deleted or unenrolled, in which case the device may replace an invalid active user profile with a default active user profile from the customer account. Even when the persistent data storage is empty, the device may rely on a default profile and its profile data.

In one or more embodiments, the service on the device that sends a request (e.g., a request to change profile data) to a remote service may interface with multiple applications and services. In this manner, a user profile may be accessed, modified, added, or deleted for multiple different applications and services. For example, when a user profile of a video streaming service is modified, the modification may be propagated to the same user profile accessed by an e-book service, music service, or the like. Depending on whether a request is correct and/or executed successfully, the remote component may respond to the requesting device with a notification (e.g., indicating success or failure). An event service of the remote component may detect the event and may propagate the event to other devices on which the updated profile is enrolled. Similarly, user preferences for a user profile may be propagated between multiple different applications and services. For example, a user purchase using a shopping service may provide insights into user interests that may be shared, with user consent and in accordance with relevant laws, with a video streaming service. In other example, user preferences set using one device, application, or service, may be shared across other devices, applications, or services. User preferences may include device settings, such as brightness, aspect ratio, sound, language, subtitles, closed captions, preferred radio stations or other content, vehicle seat settings, vehicle mirror settings, and the like. In this manner, when a user profile is selected on a device, the device may apply user preferences that may have been set for the user profile using a different device or using a different application or service on the device.

In one or more embodiments, profile identities may be mapped to third party application profiles. For example, a mechanism may allow for sharing a secure and privacy-compliant reference to an active profile (e.g., an obfuscated profile identifier rather than the actual profile and its preferences and settings) on a device with third-party application. Customers may provide user consent to share their profile information with third-party applications (e.g., via a built-in permission prompt) by providing the obfuscated profile identifier. The profile integration may allow application developers to use the active profile's reference to: 1) skip an internal profile picker, and automatically select the profile mapped to the local device; and 2) publish personalized content for the corresponding in-application profile, outside the application, to encourage traffic to the application. The profile integration also may be extended on third-party devices, including automotive devices (e.g., a vehicle manufacturer may integrate its profile with the user profile and enable voice-based recognition of the driver, and apply local preferences such as list of radio stations, seat settings, mirror settings, etc.).

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for user profile management across devices, in accordance with one or more example embodiments of the present disclosure.

Referring to FIG. 1, the system 100 may, at step 101, include a user 102 with a device 104 (e.g., a remote control device, a smartphone, etc.) control a device 110 and one or more applications 120 used by the device 110 (e.g., video streaming applications, music streaming applications, etc.). The user 102 may have one or more user profiles with a customer account (e.g., as shown with respect to FIG. 2A). As shown, the user 102 may have a user profile with a user name X, and may modify the user profile by changing the user name from X to Y. User profiles may have other information, such as a user address, an avatar as shown, and profile type (e.g., adult, child, etc.). The user 102 may add, remove, or replace any user profile settings on a device. As shown, the user 102 may change a user name and avatar for a user profile using the device 110.

Still referring to FIG. 1, at when the user profile is enrolled on a device, the updated user profile data may be presented by the one or more devices 130 at step 150. In this manner, which user profile data is presented on a particular device may be managed by user preferences specific to one or multiple devices. For example, the user name Z profile may be enrolled on the device 132, the device 134, and the device 136, whereas the user name X profile may be enrolled on the device 132 and the device 136, but not on the device 134. Accordingly, the profile data for the enrolled user name X profile may be presented on the device 132 and the device 136, but not on the device 134.

In one or more embodiments, when signed into a customer account (e.g., a customer account that includes the user profile Y), any user profile under the customer account and which is enrolled on the device may be available depending on whether the user 102 has elected to make a user profile available to other users of the customer account and/or to other devices.

In one or more embodiments, user profiles may have profile identity data, such as a user name, address, avatar, and profile type (e.g., adult, child, etc.). User profiles also may have user preferences based on user inputs, user history, and the like. Users may update their user identity data, such as by changing a user name, avatar, type of account, address, or the like, as shown at step 101. When a user profile is accessible on multiple devices (e.g., the one or more devices 130), an update to user profile identity data may be propagated to the one or more devices 130 that are allowed to access the user profile and the updated user identity data (e.g., based on profile enrollment). In this manner, when a device is signed into a customer account and the user profile is enrolled on the device, the device may receive an indication that updated user identity data for a user profile is available (e.g., step 128). Based on whether the profile is enrolled on the one or more devices 130, the one or more devices 130 may present the updated user identity data and any other user identity data for one or more additional user profiles accessible to the device (e.g., step 150). Similarly, an added or deleted user profile may be presented or removed from a customer account.

Figure 5:
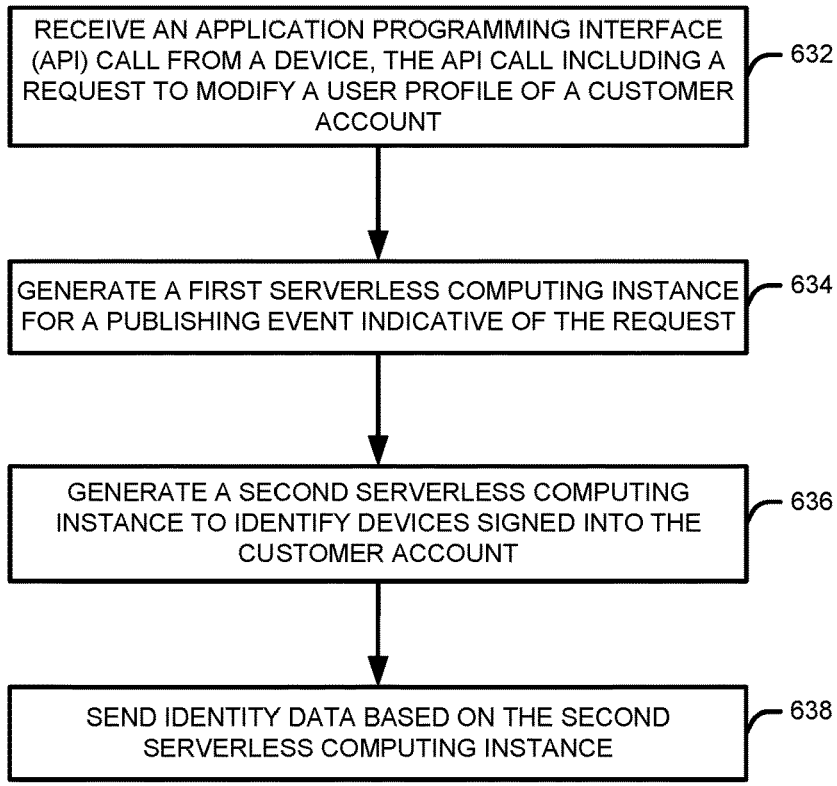
FIG. 5 illustrates a flow diagram for a process for user profile management across devices, in accordance with one or more example embodiments of the present disclosure.

In one or more embodiments, the one or more devices 130 may have a service (e.g., as shown in FIG. 5) that may be used by multiple applications on the device. When a user profile is updated, added, or deleted using the one or more applications 120, the service may access an API and may call the API with a user request to update, add, or delete a user profile for a customer account (e.g., the update of user name X at step 101). APIs may exist for profile updates and for profile enrollments and un-enrollments on a device.

The device 110 and/or the one or more devices 130 may include any suitable processor-driven device including, but not limited to, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Figure 2A:
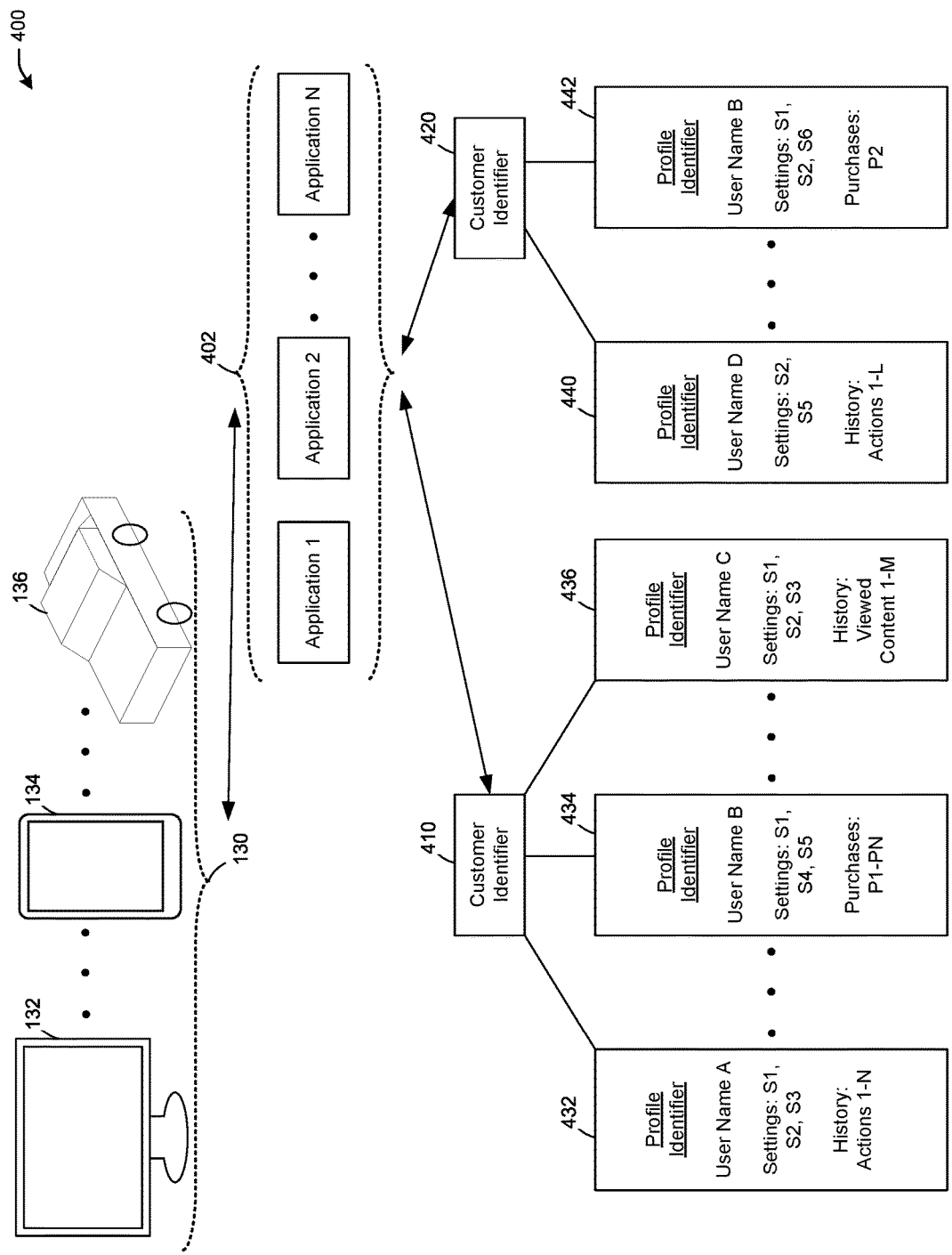
FIG. 2A illustrates example user profile management for multiple customers and applications, in accordance with one or more example embodiments of the present disclosure.

FIG. 2A illustrates example user profile management 400 for multiple customers and applications, in accordance with one or more example embodiments of the present disclosure.

Figure 2B:
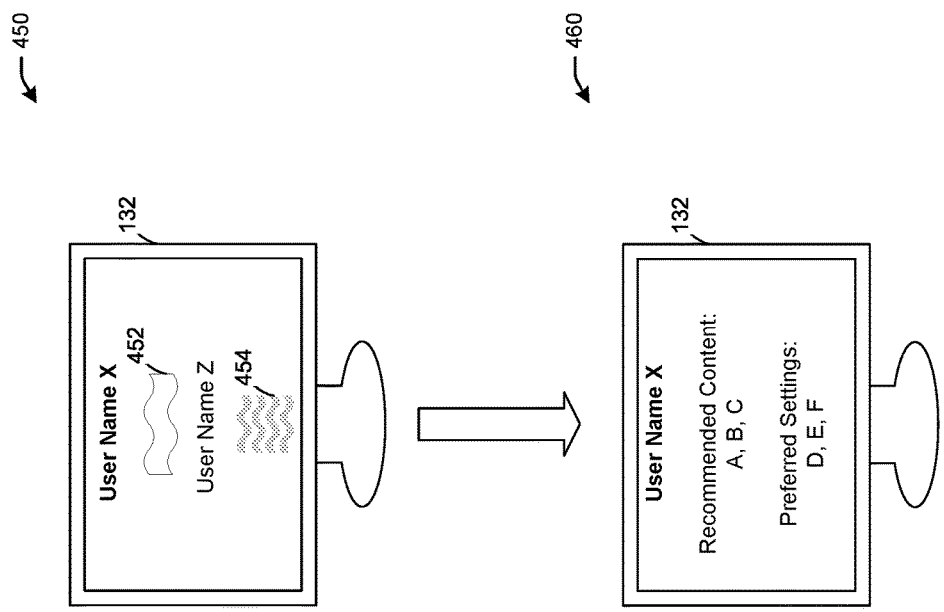
FIG. 2B illustrates an example user selection of a user profile using a device of FIG. 1, in accordance with one or more example embodiments of the present disclosure.
Figure 4:
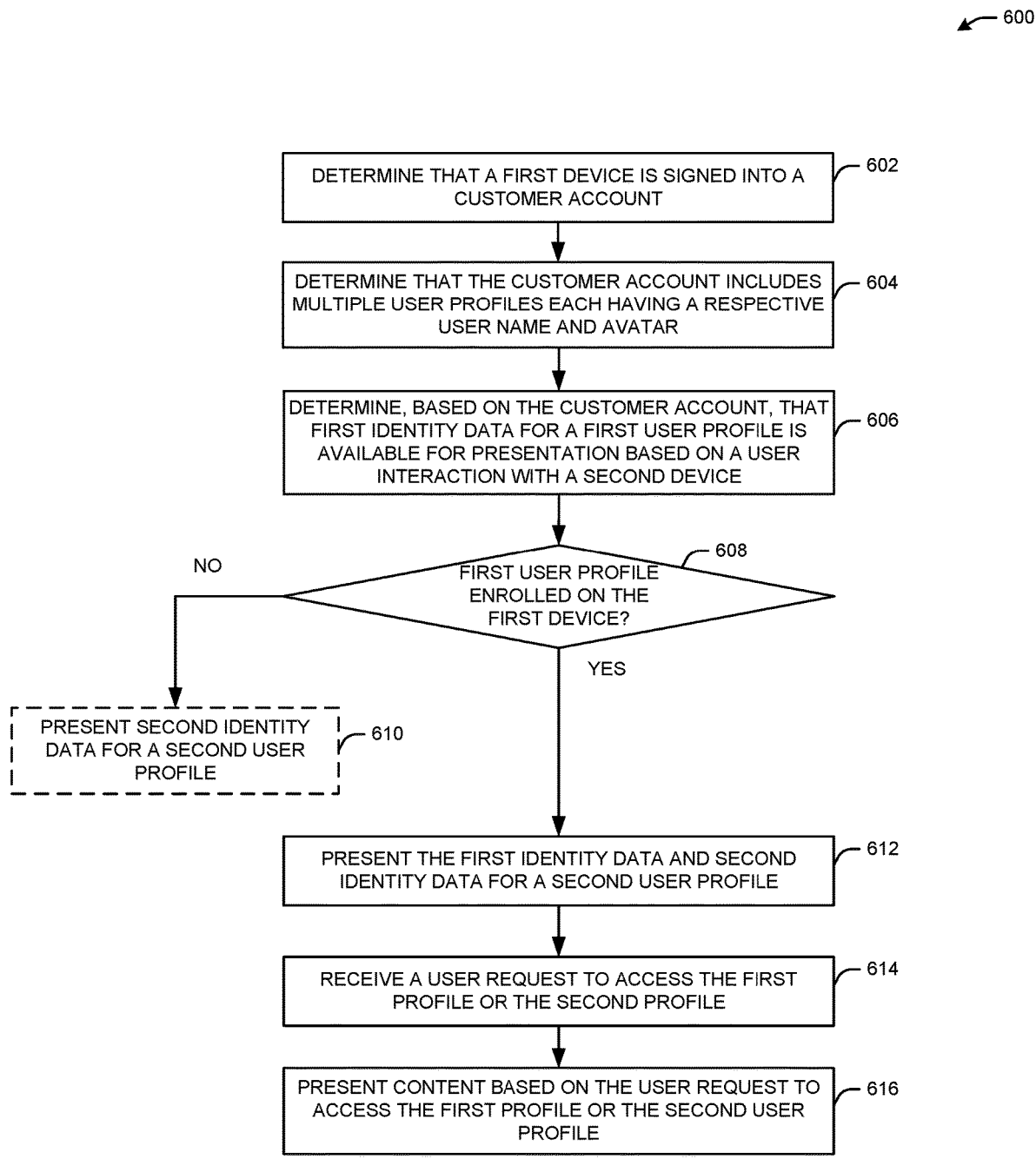
FIG. 4 illustrates a flow diagram for a process for user profile management across devices, in accordance with one or more example embodiments of the present disclosure.

Referring to FIG. 4, applications 402 (e.g., representing shopping services, video streaming services, music streaming services, e-book and audiobook services, interactive activity services, and the like) may have access to multiple customer identifiers (e.g., customer identifier 410, customer identifier 420). In particular, multiple customer accounts (e.g., each corresponding to a customer identifier) may sign into a device (e.g., the one or more devices 130 of FIG. 1) and/or the applications 402. Because the customer accounts may have one or multiple user profiles, any of the applications 402 may have access to any user profile that is allowed to be used by the applications 402 and/or the one or more devices 130 (e.g., based on profile enrollment and user consent). As shown, the customer account corresponding to the customer identifier 410 may have multiple user profiles (e.g., a user profile corresponding to a profile identifier 432, a user profile corresponding to a profile identifier 434, a user profile corresponding to a profile identifier 436, etc.). The customer account corresponding to the customer identifier 420 may have multiple user profiles (e.g., a user profile corresponding to a profile identifier 440, a user profile corresponding to a profile identifier 442, etc.). The user profiles may have user profile identity data, such as a user name, settings (e.g., device settings such as display preferences, content lists, preferred products, preferred delivery and/or pick-up times, and the like), purchase histories, content viewing histories, action histories (e.g., user actions indicating preferred content, products, etc.), and the like. When a user profile is selected (e.g., as shown in FIG. 2B), the content presented may be based on the profile's settings and history. As shown in FIG. 1, when the one or more devices 130 determine that the one or more devices 130 are signed into a customer account (e.g., using at least one of the applications 402) and the user profiles are enrolled on the one or more devices 130, the user profiles and the user profile identity data available for presentation on the one or more devices 130 may depend on user settings allowing users to manage which data is available on a particular device and/or for any of the applications 402.

FIG. 2B illustrates an example user selection of a user profile using a device of FIG. 1, in accordance with one or more example embodiments of the present disclosure.

Referring to FIG. 2B, at step 450, the device 132 of FIG. 1 may present available user profiles and their user profile identity data (e.g., user names X and Z, avatars 452 and 454). When a user (e.g., the user 102 of FIG. 1) selects a user profile (e.g., the user profile for user name X), at step 460, the device 132 may present content that is generated based on user preferences, settings, and user history as shown in FIG. 2A. For example, the recommended content and preferred settings for the user profile with user name X may be different that the recommended content and preferred settings for the user profile with user name Z. In this manner, by managing which user profiles and user profile identity data are available to certain devices and/or applications, the recommended content, settings, purchase history, and other data presented to a user may depend on which user profiles and user profile identity data are made available to the devices and/or applications.

FIG. 5 illustrates an example system 500 for user profile management across devices, in accordance with one or more example embodiments of the present disclosure.

Referring to FIG. 5, the system 500 may include the one or more devices 130 of FIG. 1, which may have storage 540, persistent storage 542 (e.g., that may store active user profile information even when the one or more devices 130 are turned off), account management modules 544 to facilitate the management of user profiles, and applications 546 (e.g., similar to the applications 402 of FIG. 2A). The one or more devices 130 may communicate with a remote system 550 (e.g., a cloud-based system), which may include application modules 552 (e.g., for providing application data to facilitate the execution of the applications 546), computing instances (e.g., computing instance 554, computing instance 556, representing event-driven instances that execute code using containers, and which may be serverless instances), a device manager 558 (e.g., to determine which of the one or more devices 130 are signed into a particular customer account at a given time and whether user profiles are enrolled on the one or more devices), a messaging service 560 (e.g., to facilitate the sending of data to the one or more devices 130 to indicate when updated user profile data is available), a customer identifier (CID) storage 562 storing CIDs (e.g., the customer identifiers 410 and 420 of FIG. 2A), a user profile identifier (PID) storage storing PIDs (e.g., the profile identifiers 432-442 of FIG. 2A), and user preference storage 566 storing user preferences (e.g., settings, purchase history, viewing history, devices and applications permitted or not permitted to access and present user profile data, etc.).

In one or more embodiments, the one or more devices 130 may have a service (e.g., the account management modules 544) that may be used by the applications 546 on the device. When a user profile is updated, added, or deleted using an application, the account management modules 544 may call an API with a user request to update, add, or delete a user profile for a customer account. The remote system 550 may listen for events including the API calls from the one or more devices 130, including user requests to update, add, or delete a user profile for a customer account. For example, events may include creation events (e.g., profile creation), update events (e.g., profile updates), enroll events, unenroll events, and delete events (e.g., profile deletion) When the remote system 550 identifies a user profile event, a workflow may be triggered. In particular, the remote system 550 may use the computing instance 554 to publish the event. The remote system 550 may identify published events and obtain from the device manager 558 a list of devices that have signed into a customer account with which an event is associated, and on which a user profile is enrolled. For example, when a published event is identified, the remote system 550 may identify a profile identifier identifying the user profile (e.g., from the PID storage 564), and may map the user profile to the corresponding customer account (e.g., CID). The remote system 550 may obtain the list of devices which have signed into the customer account and on which a user profile is enrolled, which may include the device used to generate the event, and other devices. The messaging service 560 may send messages to the devices to provide the event data (e.g., updated profile identity data, created profiles, deleted profiles, profile enrollments, etc.) to the one or more devices 130. For example, the computing instance 556 may cause the messaging service 560 to generate and send the event data to devices on which the profile is enrolled. In this manner, profile events may be propagated to the one or more devices 130 to allow for synchronization of profile data across multiple devices.

In one or more embodiments, a device of the one or more devices 130 may be offline (e.g., a connection between the device and the messaging service 560 may be offline), so the device may be unable to receive event data to synchronize user profile data with other devices of the one or more devices 130 that use a same customer account. The device may have the persistent storage 542 that may cache profile data (e.g., profile identity data). The device may receive a message from the messaging service 560 indicating that profile event data is available to add, delete, or modify a user profile. However, when the device is offline and cannot receive the event data, the device may present the profile data stored in the persistent storage 542 when a user signs into a customer account using the device, even though the user profile data for the customer account may not be up-to-date due to the disconnection preventing the event data from being provided to the device. Once the device is online again and receives the event data from the messaging service 560, the device may store the updated profile data in the persistent storage 542. Any of the applications 546 that executes may use the profile data in the persistent storage 542 to determine which user profile to apply.

In one or more embodiments, the one or more devices 130 may determine which user profile from among multiple user profiles accessible to the device is active (e.g., being used on the device). Because the applications 546 on the one or more devices 130 may access the user profile, it may be beneficial for the one or more devices 130 to track which user profile is active on an application or service so that when a user accesses a different application or service, the different application or service may use the active profile without requiring the user to sign into the same user profile again. When a user is signed into a user profile or has designated the user profile as a default user profile, the device may maintain the active user profile in the persistent storage 542 of the device so that when the user accesses another application or service of the device, the application or service may identify the active user profile as stored in the persistent storage 542. In this manner, the persistent storage 542 may be empty the first time that a device is started and the first time that a customer account is accessed using the device. In addition, an active user profile may be identified as invalid when the active user profile has been deleted or unenrolled, in which case the device may replace an invalid active user profile with a default active user profile from the customer account.

In one or more embodiments, the account management modules 544 on the device that send event data to the remote system 550 may interface with multiple applications and services (e.g., the applications 546). In this manner, a user profile may be accessed, modified, added, or deleted for multiple different applications and services. For example, when a user profile of a video streaming service is modified, the modification may be propagated to the same user profile accessed by an e-book service, music service, or the like. In particular, when the account management modules 544 receive a profile event (e.g., a profile modification), the account management modules 544 may update the persistent data storage 542 with the updated profile information and may send the updated profile information to the applications 546 for use. Similarly, user preferences for a user profile may be propagated between multiple different applications and services. For example, a user purchase using a shopping service may provide insights into user interests that may be shared, with user consent and in accordance with relevant laws, with a video streaming service. In other example, user preferences set using one device, application, or service, may be shared across other devices, applications, or services. User preferences may include device settings, such as brightness, aspect ratio, sound, language, subtitles, closed captions, and the like. In this manner, when a user profile is selected on a device, the device may apply user preferences that may have been set for the user profile using a different device or using a different application or service on the device.

Any of the one or more devices 130 and or the remote system 550 may be configured to communicate with each other via one or more communications networks 580 and/or 590 wirelessly or wired. Any of the communications networks 580 and/or 590 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 580 and/or 590 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 580 and/or 590 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

FIG. 4 illustrates a flow diagram for a process 600 for user profile management across devices, in accordance with one or more example embodiments of the present disclosure.

At block 602, a system (or device, e.g., the one or more devices 130 of FIG. 1, the remote system 550 of FIG. 5) may determine that a first device (e.g., one of the one or more devices 130 of FIG. 1) is signed into a customer account having a customer identifier. For example, the device manager 558 of FIG. 5 may determine which devices are signed into a customer account having a customer identifier. Alternatively or in addition, the one or more devices 130 may determine if an active user profile is stored in the persistent storage 542 of FIG. 5, indicating that the customer account that includes the user profile is signed into with the one or more devices 130.

At block 604, the system may determine that a customer account includes multiple user profiles (e.g., as shown in FIG. 2A), each having respective user profile identity data such as a user name, an avatar, a location, preferred settings, and the like. For example, a customer account may have a first user profile and a second user profile. The first user profile may have a first user name, first settings, a first avatar, and a first location. The second user profile may have a second user name, second settings, a second avatar, and a second location. However, not all user profiles and their respective profile identity data may be available to all devices and/or applications executing on a device. Such availability may be based on profile enrollment and user consent.

At block 606, the system may determine, based on the customer account, that first identity data for a first user profile of the customer account is available for presentation based on a user interaction with a different device (e.g., the device 110 of FIG. 1). The first identity data may be the result of a modification to the first user profile (e.g., a different user name, avatar, location, settings, etc.), an addition to the first user profile (e.g., an added user name, avatar, location, settings, etc.), or a deletion from the first user profile (e.g., a removed user name, avatar, location, settings, etc.). The modification, addition, or deletion may have been made previously with a device. In this manner, the modification to the first identity data may not yet be available to a particular device even if the modification has been made on another device. The remote system 550 may listen for an event that provides the modification, and may generate the computing instance 554 to publish the event. In response, the remote system 550 may generate the computing instance 556 to cause generation of one or more messages that indicate to the one or more devices 130 that the first identity data is available for presentation (e.g., FIG. 1). Alternatively, a user profile may not be enrolled on a device, so the first identity data may not be presented using such a device.

At block 608, the system may determine whether a user input has been received and indicates that the first user profile is enrolled on the first device. When the first user profile is not enrolled on the first device, the process 600 may continue to block 610 where, optionally, the system may present second user identity data for a second user profile of the customer account (e.g., a different user profile). When the user profile having the first identity data is enrolled on the first device, the process 600 may continue to block 612. In this manner, users may have the option not to push or receive updated user profile identity data to/from particular devices and applications. The user request to present the first identity data may be differentiated from a simple user selection of an application, for example, as the selection of an application does not necessarily mean that the user has enrolled a particular user profile on the device. In this manner, profile enrollment and user consent may govern whether user profile data is presented using a device or application based on whether a user has enrolled a profile on a device and/or consented to allow profile data to be shared with a particular application).

At block 612, the system may present the first identity data and second identity data for a second user profile of the customer account (e.g., FIG. 1). The presentation may include a user name, avatar, location, or other data for the user profiles made available to a device. At block 614, the system may receive a user request to access one of the user profiles (e.g., FIG. 2B). Based on the selected user profile, at block 616, the system may present content that is customized to the user profile, and may be presented based on user-preferred settings. In some embodiments, because the user profile may be associated with a particular application, even another application may use the user profile and its data. For example, the user profile may be used for a shopping application profile indicating user purchases and product search history, and a video streaming application may use the user profile to determine user preferences for content presentation (e.g., brightness, size, etc.) and to determine recommended content based on the user's purchase and viewing history. In this manner, because a customer account may have multiple user profiles with data for one or multiple applications, the data from a user profile may be used by multiple different applications (e.g., applications of different types, such as content streaming applications, shopping applications, e-book applications, and the like).

FIG. 5 illustrates a flow diagram for a process 630 for user profile management across devices, in accordance with one or more example embodiments of the present disclosure.

Figure 3:
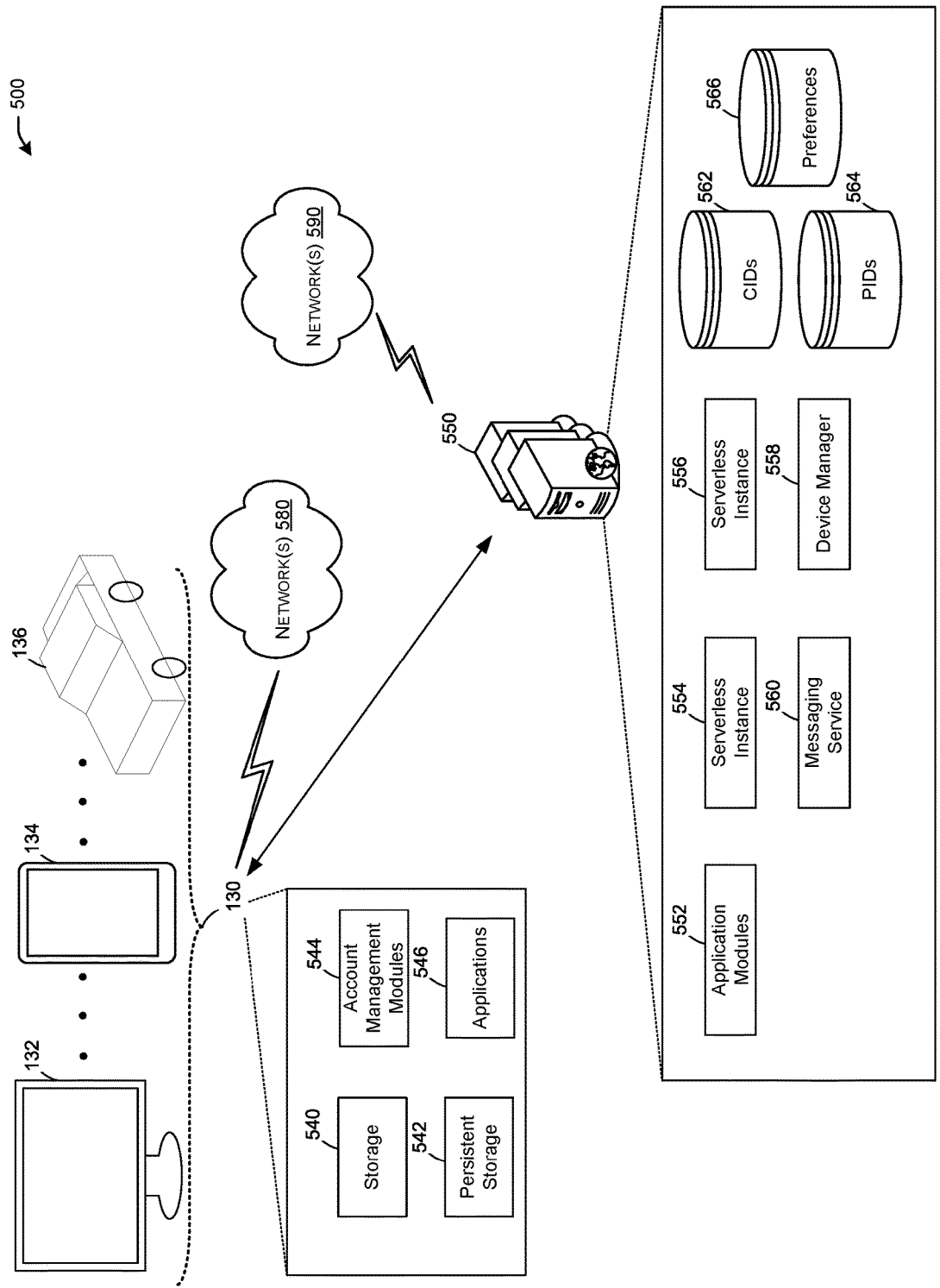
FIG. 3 illustrates an example system for user profile management across devices, in accordance with one or more example embodiments of the present disclosure.

At block 632, a system (or device, e.g., the remote system 550 of FIG. 3) may receive and API call or other transmission from a device (e.g., the one or more devices 130 of FIG. 1). The API call or other transmission including a request to modify, add, or delete a user profile or any identity data for a user profile of a customer account. The system may listen for events including user requests to update, add, or delete a user profile for a customer account. For example, events may include creation events (e.g., profile creation), update events (e.g., profile updates), enroll events, unenroll events, and delete events (e.g., profile deletion). When the system identifies a user profile event (e.g., an event that originates from outside the system), a workflow may be triggered. The system may process the request and make changes to the profile data based on the request.

At block 634, the system may generate a first computing instance (e.g., the computing instance 554 of FIG. 3) for a publishing event indicative of the request. The first computing instance may change the user profile data based on the event, and the change to the user profile data (e.g., in a data storage) may trigger a second computing instance. The second computing instance may be triggered even in the absence of the first computing instance (e.g., when another entity changes the user profile data).

At block 636, the system may generate the second computing instance (e.g. the computing instance 556 of FIG. 3) to identify devices (e.g., the one or more devices 130) on which a profile has been enrolled. The system may store (e.g., using the device manager 558 of FIG. 3) a list of devices (e.g., device identifiers) authenticated to use a customer account having a customer identifier and on which the profile has been enrolled. The system may identify published events (e.g., published by the first computing instance or another service) and obtain a list of devices on which the profile has been enrolled. For example, when a published event is identified, the system may identify a profile identifier identifying the user profile, and may determine that the user profile is enrolled on one or more devices. The system may obtain the list of devices on which the user profile has been enrolled, which may include the device used to generate the event, and other devices.

At block 638, the system may send the identity data of the user profile based on the second computing instance. The system may send a message to the one or more devices 130, for example, indicating that the identity data of the user profile is available for presentation when the user profile has been enrolled on a device. In this manner, the profile enrollment may occur before block 638 so that the identity data is propagated to devices on which the user profile has been enrolled. The second computing instance may include code that causes the messaging service 560 to generate and send the messages with the notifications that the profile identity data is available, and that may include the profile identity data for presentation.

Figure 6:
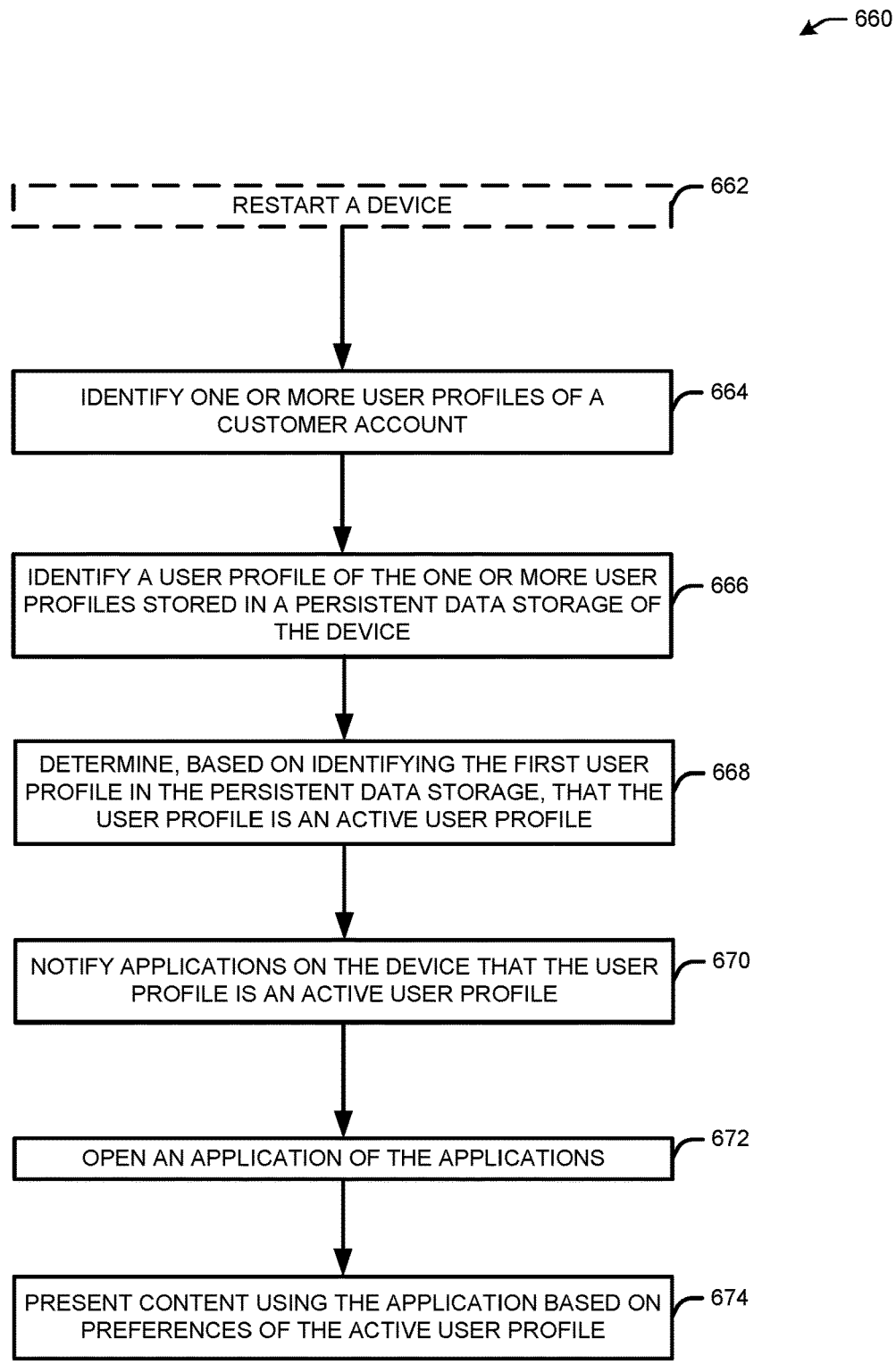
FIG. 6 illustrates a flow diagram for a process for user profile management on a device, in accordance with one or more example embodiments of the present disclosure.

FIG. 6 illustrates a flow diagram for a process 660 for user profile management on a device, in accordance with one or more example embodiments of the present disclosure.

At block 662, a system (or device, e.g., the one or more devices 130 of FIG. 1) optionally may restart or turn off and turn back on. Before the device restarts or is turned off, the device may be signed into a customer account. The device may have a persistent data storage (e.g., the persistent storage 542 of FIG. 3) that may cache profile data (e.g., profile identity data). The device may receive a message from the remote system 550 of FIG. 3, for example, indicating that profile event data is available to add, delete, or modify a user profile. However, when the device is offline, whether during a restart or because a network connection is unavailable, the device may not receive the event data.

At block 664, upon restarting or reestablishing a network connection, the device may identify one or more user profiles available to the device. For example, the device may query the remote system 550 for a list of available user profiles that the device may access. The remote system 550 may provide a list of any profile identifiers indicating profiles to which the device has access.

At block 666, the device may determine whether a user profile is stored in the persistent storage, indicating that the user profile is an active user profile (e.g., the device and/or one of its applications have signed into a customer account having the user profile). At block 668, when the active user profile is on the list of accessible profiles provided by the remote system 550, the device may determine that the user profile is an active user profile for the device and that the device may use the active user profile and its data.

At block 670, the device may notify its applications (e.g., the applications 402 of FIG. 2A) of the active user profile to allow the applications to use the corresponding user profile data (e.g., identity data, settings, etc.). In this manner, a user may not have to sign into a customer account and select a user profile when using an application, even after restarting the device. The device may present the profile data stored in the persistent data storage when a user signs into a customer account using the device, even though the user profile data for the customer account may not be up-to-date due to the disconnection preventing the user profile data from being provided to the device.

At block 672, the device may open an application (e.g., based on a user selection of the application). At block 674, the device may present content using the application based on the preferences of the active user profile. When the application is permitted to use the active user profile, the active user profile and relevant data may be made available to the application for use, such as device settings, viewing history, download history, purchase history, and the like. In this manner, because a customer account may have multiple user profiles with data for one or multiple applications, the data from a user profile may be used by multiple different applications (e.g., applications of different types, such as content streaming applications, shopping applications, e-book applications, and the like).

The examples presented herein are not intended to be limiting.

Figure 7:
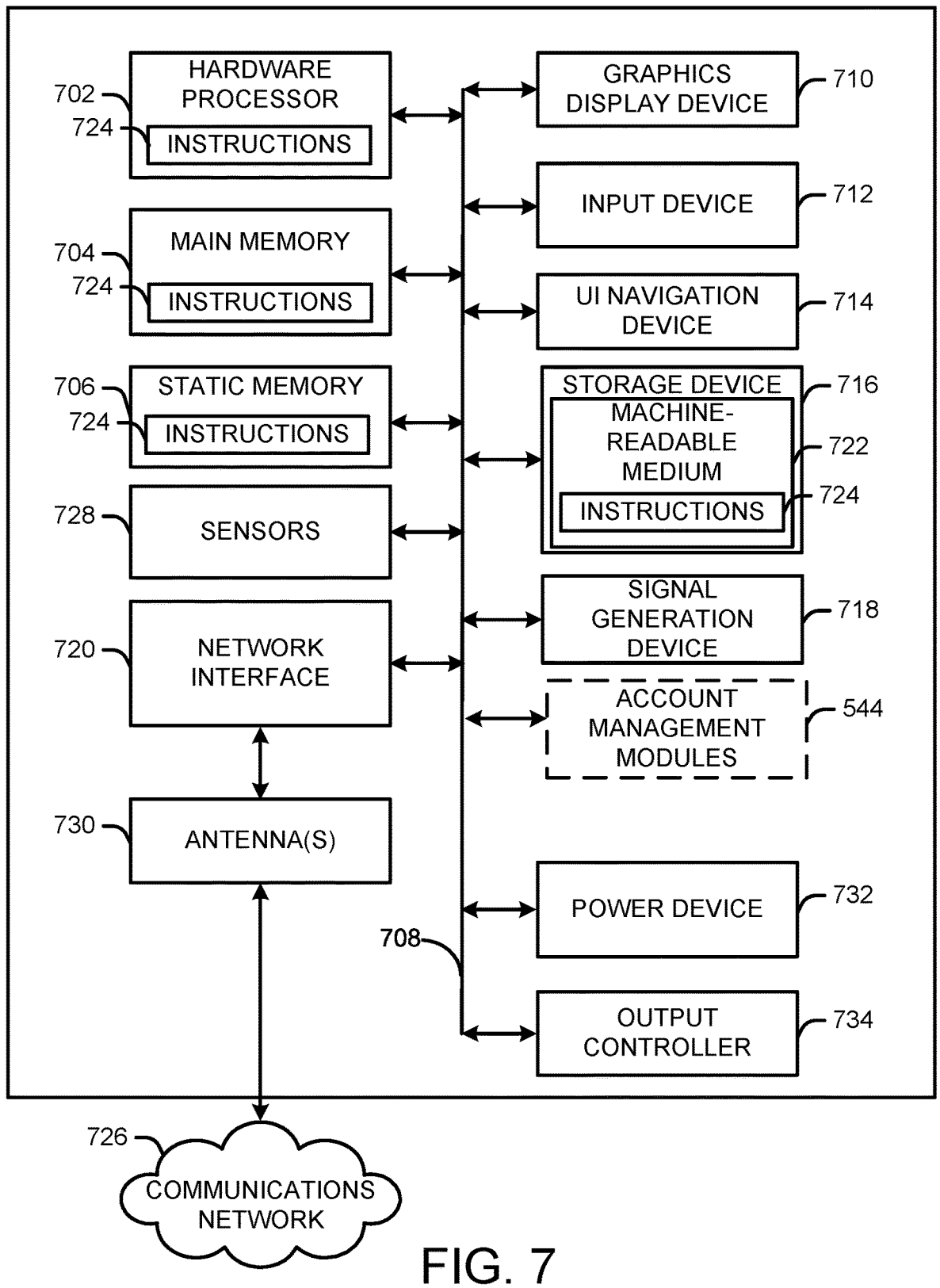
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the one or more devices 130 of FIG. 1, the remote system 550 of FIG. 3) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a media device, a remote control device, a streaming media device, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a tensor processing unit (TPU) having an artificial intelligence accelerator application-specific integrated circuit (ASIC), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker, emitters, etc.), the account management modules 544 of FIG. 3 (e.g., when implemented by the one or more devices 130), a network interface device/transceiver 720 coupled to antenna(s) 730, and one or more sensors 728. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a media device, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    determining, by at least one processor, that a first device is signed into a customer account comprising a first user profile comprising a first user name and a first avatar;
    publishing, by the at least one processor, using a computing instance, based on a user interaction with a second device, an event indicating that a second user profile of the customer account has been created, the second user profile comprising a second user name and a second avatar;
    identifying, by the at least one processor, based on publishing the event, a list of devices on which the second user profile is enrolled, the list of devices comprising the first device; and
    causing presentation at the first device, by the at least one processor, based on the first device being in the list of devices, identity data for the second user profile, the identity data comprising the second user name and the second avatar.

2. The method of claim 1, further comprising:
    receiving an application programming interface (API) call from the second device, the API call comprising a user request to create the second user profile using the second user name and the second avatar, wherein the second user profile is created based on the API call;
    generating the computing instance based on the API call;
    generating a second computing instance associated with identifying the list of devices; and
    sending the identity data to the first device based on the second computing instance.

3. The method of claim 1, further comprising:
    identifying the first user profile in a persistent data storage;
    determining, based on identifying the first user profile in the persistent data storage, that the first user profile is an active user profile and that a third user profile of the customer account is an inactive user profile; and sending an indication to one or more computer-executable applications that the first user profile is the active user profile and may be used by the one or more computer-executable applications without requiring the one or more computer-executable applications to sign into the active user profile.

4. The method of claim 1, further comprising:
determining, based on the customer account, that second identity data for a third user profile of the customer account is available for presentation, the second identity data based on a second user interaction with the second device;
publishing a second event indicating that the second identity data are available for presentation for the third user profile; and
determining, based on the list of devices, that the third user profile is not enrolled on the first device,
wherein the second identity data are not presented using the first device based on the third user profile not being enrolled on the first device.

5. A method comprising:
determining, by at least one processor, that a first device is signed into a customer account comprising a first user profile comprising first identity data;
publishing, by the at least one processor, using a computing instance, based on a user interaction with a second device, an event indicating that a second user profile of the customer account has been created, the second user profile comprising second identity data;
identifying, by the at least one processor, based on publishing the event, a list of devices on which the second user profile is available for use, the list of devices comprising the first device; and
causing presentation at the first device, by the at least one processor, causing presentation at the first devices, the second identity data.

6. The method of claim 5, wherein the first identity data comprises a first user name and a first avatar, and wherein the second identity data comprises a second user name and a second avatar.

7. The method of claim 5, the first user profile comprising a first user name and a first avatar, the second user profile comprising a second user name and a second avatar, the method further comprising:
receiving a user request to replace the first user name with a third user name or to replace the first avatar with a third avatar; and
generating a second computing instance associated with publishing a second event indicative of the user request.

8. The method of claim 5, further comprising:
identifying the first user profile in a persistent data storage;
determining, based on identifying the first user profile in the persistent data storage, that the first user profile is an active user profile and that a third user profile of the customer account is an inactive user profile; and
sending an indication to one or more computer-executable applications that the first user profile is the active user profile and may be used by the one or more computer-executable applications without requiring the one or more computer-executable applications to sign into the active user profile.

9. The method of claim 5, further comprising:
determining that a third user profile of the customer account has been added or deleted;

sending, based on the addition or deletion of the third user profile, a request for information associated with the third user profile;
receiving the information associated with the third user profile; and
updating a persistent data storage based on the information associated with the third user profile, the updating comprising storing the information in the persistent data storage or removing the information from the persistent data storage.

10. The method of claim 5, further comprising:
determining, based on the customer account, that third identity data for the second user profile is available for presentation, the third identity data based on a user interaction with the second device, the third identity data replacing the second identity data; and
determining that the first device is not permitted to present the second user profile,
refraining from presenting wherein the third identity data are not presented using the first device based on the first device not being permitted to present the second user profile.

11. The method of claim 5, wherein the first user profile is associated with a first computer-executable application, and wherein the second user profile is associated with a second computer-executable application.

12. The method of claim 5, further comprising:
determining, based on the customer account, that the second identity data has been deleted;
publishing a second event indicative of the second identity data being deleted;
identifying, based on the second event being published, a second list of devices on which that the second user profile is available for use, the second list comprising the first device; and
causing presentation at the first device, based on the first device being in the second list of devices, an indication that the second identity data has been deleted.

13. The method of claim 5, further comprising:
identifying a user consent to share with an application an obfuscated identifier associated with the first user profile;
receiving a third user request to execute the application; and
executing the application using data associated with the first user profile based on the user consent.

14. The method of claim 13, wherein the user interaction is with a second application different than the application.

15. The method of claim 5, further comprising:
determining that a third device is not in the list of devices, wherein the first identity data are not presented on the third device based on the third device not being in the list of devices.

16. A system comprising:
a first device configured to:
send, to a second device, a first user request to create, using first identity data, a first user profile of a customer account comprising a second user profile;
the second device configured to:
receive, from the first device, the first user request;
publish an event indicative of the first user request;
identify, based on the event being published, a list of devices on which the first user profile is available for use, the list of devices comprising the first device and a third device; and
send the first identity data to the third device based on the third device being in the list of devices; and the third device configured to:
  determine that the third device is signed into the customer account; and
  receive an indication that the first identity data for the first user profile is available for presentation.

17. The system of claim 16, wherein the third device comprises a persistent data storage, and wherein the third device is further configured to:
  determine the first user profile and a second user profile are associated with the customer account;
  identify the first user profile in the persistent data storage;
  determine, based on identifying the first user profile in the persistent data storage, that the first user profile is an active user profile and that a third user profile of the customer account is an inactive user profile; and
  send an indication to one or more computer-executable applications that the first user profile is the active user profile and may be used by the one or more computer-executable applications without requiring the one or more computer-executable applications to sign into the active user profile.

18. The system of claim 17, wherein the third device is further configured to:
  determine that a wireless connection of the third device is offline;
  determine, based on the customer account, that second identity data for the first user profile is available for presentation, the second identity data based on a user interaction with the first device, the second identity data replacing the first identity data; and
  present, based on the wireless connection being offline, the second identity data.

19. The system of claim 17, wherein the second device is further configured to:
  determine, based on the customer account, that second identity data for the first user profile is available for presentation, the second identity data based on a user interaction with the first device, the second identity data replacing the first identity data;
  publish a second event indicating that the second identity data are available for presentation; and
  identify, based on the second event being published, a second list of devices on which the first user profile is available for use.

20. The system of claim 16, wherein the second device is further configured to:
  identify a user consent to share with an application an obfuscated identifier associated with the first user profile;
  receive a third user request to execute the application; and
  execute the application using data associated with the first user profile based on the user consent.

* * * * *